(12) United States Patent
Hsu et al.

(10) Patent No.: US 12,265,295 B2
(45) Date of Patent: Apr. 1, 2025

(54) ELECTRONIC DEVICE

(71) Applicant: InnoLux Corporation, Miao-Li County (TW)

(72) Inventors: Hsu-Kuan Hsu, Miao-Li County (TW); Tzu-Chieh Lai, Miao-Li County (TW); Chih-Chin Kuo, Miao-Li County (TW); En-Hsiang Chen, Miao-Li County (TW); Wenqi Lin, Miao-Li County (TW); Mao-Shiang Lin, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/584,203

(22) Filed: Feb. 22, 2024

(65) Prior Publication Data
US 2024/0319533 A1 Sep. 26, 2024

Related U.S. Application Data

(60) Provisional application No. 63/491,611, filed on Mar. 22, 2023.

(30) Foreign Application Priority Data

Dec. 18, 2023 (CN) .......................... 202311736541.6

(51) Int. Cl.
*G02F 1/1334* (2006.01)
*G02F 1/1335* (2006.01)
*G02F 1/1343* (2006.01)

(52) U.S. Cl.
CPC ...... *G02F 1/133553* (2013.01); *G02F 1/1334* (2013.01); *G02F 1/133512* (2013.01); *G02F 1/133514* (2013.01); *G02F 1/134309* (2013.01)

(58) Field of Classification Search
CPC ..................................... G02F 1/1334
See application file for complete search history.

(56) References Cited

U.S. PATENT DOCUMENTS

| 6,559,916 B1 * | 5/2003 | Urabe ................. G02F 1/13725 |
| | | 349/113 |
| 2014/0160377 A1 * | 6/2014 | Yamagishi ............ G06F 1/1643 |
| | | 349/12 |

(Continued)

FOREIGN PATENT DOCUMENTS

JP 2000321993 * 11/2000 ............... G09F 9/00

OTHER PUBLICATIONS

Kun Ma, Rong Ma, Rui He, Wei Cheng, Chao Wang, Guanghui Liu, Research on the Structure and Optical Performance of Reflective Liquid Crystal Display, International Conference on Display Technology 2022 (vol. 53, Issue S1). 2022, 3 pages.

*Primary Examiner* — Sang V Nguyen
(74) *Attorney, Agent, or Firm* — Muncy, Geissler, Olds & Lowe, P.C.

(57) ABSTRACT

An electronic device includes pixel regions and pixel spacing regions, and includes: a display layer disposed in the pixel regions and the pixel spacing regions, and including a liquid crystal material and a dye material; and reflective layers respectively disposed in the pixel regions, and at one side of the display layer. The display layer is in a scattering state under a non-display state, and light is scattered by the liquid crystal material and absorbed by the dye material when the light passes through the display layer. The display layer in the pixel regions is in a transmissive state and the display layer in the pixel spacing regions is in a scattering state under a display state, and light passes through the liquid crystal material and the dye material in the pixel (Continued)

regions and is reflected by the reflective layers when the light passes through the display layer.

18 Claims, 12 Drawing Sheets

(56) References Cited

U.S. PATENT DOCUMENTS

2018/0286907 A1* 10/2018 Su .................... H01L 27/14868
2019/0271882 A1*  9/2019 Chen ................ G02F 1/133603

* cited by examiner

ELECTRONIC DEVICE

CROSS-REFERENCE TO RELATED APPLICATIONS

This application claims the benefits of the Chinese Patent Application Serial Number 202311736541.6, filed on Dec. 18, 2023, the subject matter of which is incorporated herein by reference.

This application claims the benefit of filing date of U.S. Provisional Application Ser. No. 63/491,611, filed Mar. 22, 2023 under 35 USC § 119(e)(1).

BACKGROUND

Field

The present disclosure is related to an electronic device. More specifically, the present disclosure is related to a reflective electronic device with reflective layers.

Description of Related Art

Reflective display devices are used in various fields, which can reduce energy loss and are beneficial to environmental protection. However, there are still many shortcomings that need to be improved for reflective display devices.

SUMMARY

The present disclosure provides an electronic device, which comprises a plurality of pixel regions and a plurality of pixel spacing regions and comprises: a display layer disposed in the plurality of pixel regions and the plurality of pixel spacing regions, and comprising a liquid crystal material and a dye material; a plurality of reflective layers respectively disposed in the plurality of pixel regions, and disposed at one side of the display layer; and a plurality of color filter layers respectively disposed in the plurality of pixel regions, and disposed between the display layer and the plurality of reflective layers. The display layer is in a scattering state under a non-display state, and at least part of light is scattered by the liquid crystal material and absorbed by the dye material when the light passes through the display layer. The display layer in the plurality of pixel regions is in a transmissive state and the display layer in the plurality of pixel spacing regions is in a scattering state under a display state, and at least part of light passes through the liquid crystal material and the dye material in the plurality of pixel regions and is reflected by the plurality of reflective layers when the light passes through the display layer in the plurality of pixel regions.

The present disclosure further provides another electronic device, which comprises a plurality of pixel regions and a plurality of pixel spacing regions and comprises: a display layer disposed in the plurality of pixel regions and the plurality of pixel spacing regions, and comprising a liquid crystal material and a dye material; a plurality of reflective layers respectively disposed in the plurality of pixel regions, and disposed at one side of the display layer; and a plurality of color filter layers respectively disposed in the plurality of pixel regions, and disposed at one side of the display layer away from the plurality of reflective layers. The display layer is in a scattering state under a non-display state, and at least part of light is scattered by the liquid crystal material and absorbed by the dye material when the light passes through the display layer. The display layer in the plurality of pixel regions is in a transmissive state and the display layer in the plurality of pixel spacing regions is in a scattering state under a display state, and at least part of light passes through the liquid crystal material and the dye material in the plurality of pixel regions and is reflected by the plurality of reflective layers when the light passes through the display layer in the plurality of pixel regions.

Other novel features of the disclosure will become more apparent from the following detailed description when taken in conjunction with the accompanying drawings.

DETAILED DESCRIPTION

Figure 1:
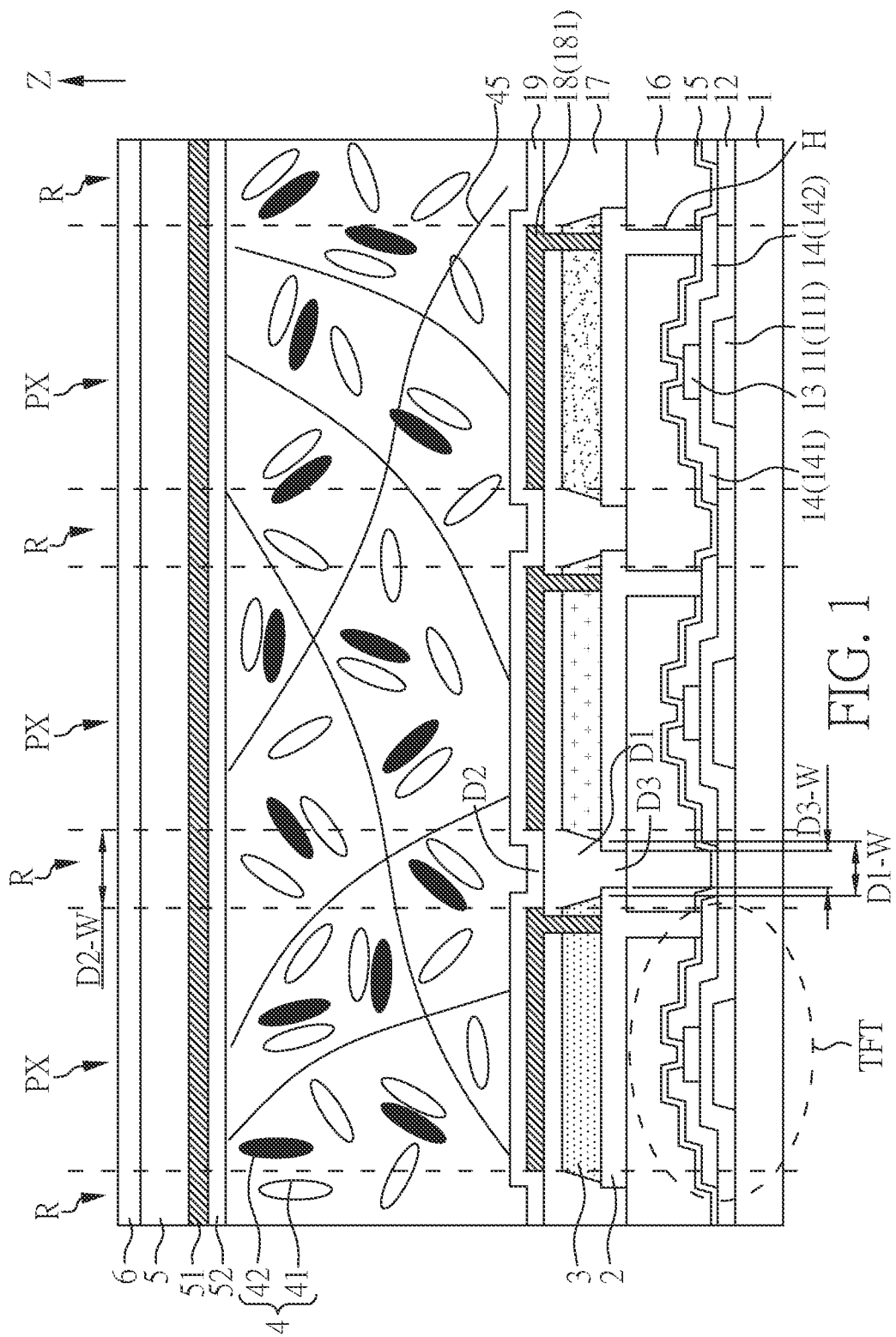
FIG. 1 is a schematic view of an electronic device according to one embodiment of the present disclosure.

The following is a detailed description of the electronic device of the embodiments of the present disclosure. It should be understood that the following description provides many different embodiments for implementing different aspects of some embodiments of the present disclosure. The specific components and arrangements described below are used to briefly and clearly describe some embodiments of the present disclosure. Of course, these are only examples and not limitations of the present disclosure. In addition, similar and/or corresponding reference numbers may be used to identify similar and/or corresponding elements in different embodiments to clearly describe the present disclosure. However, the use of these similar and/or corresponding reference numbers is only for the purpose of simply and clearly describing some embodiments of the present disclosure, and does not imply any connection between the different embodiments and/or structures discussed.

It should be understood that relative terms, such as "lower" or "bottom" or "higher" or "top" may be used in the embodiment to describe the relative relationship of one element to another element shown in the figures. It will be understood that if the device in the figures is turned upside down, elements described as being on the "lower" side would then be elements described as being on the "upper" side. The embodiments of the present disclosure can be understood together with the figures, and the figures of the present disclosure are also regarded as part of the disclosure description. It should be understood that the figures of the present disclosure are not drawn to scale and, in fact, the dimensions of elements may be arbitrarily enlarged or reduced in order to clearly illustrate features of the present disclosure.

In the present disclosure, one structure (or layer, component, or substrate) is disposed on/above another structure (or layer, component, or substrate), this may mean that the two structures are adjacent and directly connected, or the two structures are adjacent and indirectly connected. Indirect connection means that there is at least one intermediary structure (or intermediary layer, intermediary component, intermediary substrate, intermediary spacer) between two structures, the lower surface of one structure is adjacent to or directly connected to the upper surface of the intermediary structure, and the upper surface of another structure is adjacent to or directly connected to the lower surface of the intermediate structure. The intermediary structure can be composed of a single-layer or multi-layer physical structure or non-physical structure, and is not limited. In the present disclosure, when a structure is disposed "on" the other structure, it may mean that the structure is "directly" disposed on the other structure, or that the structure is "indirectly" disposed on the other structure, that is, at least one structure may be sandwiched between the structure and the other structure.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation. The claims and the description may not use the same words. For example, a first element in the description may be a second element in the claims.

In some embodiments of the present disclosure, terms related to joining and connecting, such as "connection", "interconnection", etc., unless otherwise defined, may mean that two structures are in direct contact, or may also mean that two structures are not in direct contact and there are other structures located between these two structures. The terms "joint" and "connected" can also include situations where both structures are movable, or where both structures are fixed. In addition, the terms "electrical connection" or "coupling" include any direct and indirect means of electrical connection.

The terms, such as "about", "substantially", or "approximately", are generally interpreted as within 10%, 5%, 3%, 2%, 1%, or 0.5% of a given value or range. Unless otherwise stated, when a value is "in a range from a first value to a second value" or "in a range between a first value and a second value", the value can be the first value, the second value, or another value between the first value and the second value. Furthermore, any two numerical values or directions used for comparison may have certain errors. If the first value is equal to the second value, it implies that there may be an error of about 10% between the first value and the second value. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees. In the present disclosure, the terms "a given range is a first value to a second value" and "a given range falls within the range of a first value to a second value" mean that the given range includes the first value, the second value, or another value between the first value and the second value.

Furthermore, according to the embodiment of the present disclosure, an optical microscope (OM), a scanning electron microscope (SEM), a film thickness profiler (α-step), an ellipsometer, or other suitable manners can be used to measure the thickness, length or width of each component or the distance or angle between components. Specifically, according to some embodiments, a scanning electron microscope can be used to obtain cross-sectional images of the structure and measure the thickness, length or width of each component or the distance or angle between components.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names. In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

It should be noted that the technical solutions provided by different embodiments hereinafter may be replaced, combined or used in combination, so as to constitute another embodiment without violating the spirit of the present disclosure. The features of various embodiments can be combined and used arbitrarily as long as they do not violate the spirit of the present disclosure or conflict with each other.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way. The present disclosure may be understood by referring to the following detailed description in conjunction with the accompanying drawings. It should be noted that, for the sake of easy understanding for readers and for the simplicity of the drawings, many of the figures in the present disclosure only depict a part of the electronic device, and specific components in the figures are not drawn according to actual scale. In addition, the number and size of components in the figures are only for illustration and are not intended to limit the scope of the present disclosure.

Throughout the present disclosure and the appended claims, certain words are used to refer to particular elements. Those skilled in the art will understand that electronic device manufacturers may refer to the same component by different names. The present disclosure is not intended to differentiate between components that have the same function but have different names.

The electronic device of the present disclosure may include electronic components. The electronic components may include passive components, active components, or a combination thereof, such as capacitors, resistors, inductors, varactor diodes, variable capacitors, filters, diodes, transistors, inductors, microelectromechanical system components (MEMS), liquid crystal chips, etc., but the present disclosure is not limited thereto. The diodes may include light emitting diodes or non-light emitting diodes. The diodes include P-N junction diodes, PIN diodes or constant current diodes. The light emitting diodes may include, for example, organic light emitting diodes (OLEDs), mini LEDs, micro LEDs, quantum dot LEDs, fluorescence, phosphors, other suitable materials, or a combination thereof, but the present disclosure is not limited thereto. Sensors may include, for example, capacitive sensors, optical sensors, electromagnetic sensors, fingerprint sensors (FPSs), touch sensors, antennas, or pen sensors, etc., but the present disclosure is not limited thereto. In the following, a display device is used as an electronic device to illustrate the content of the present disclosure, but the present disclosure is not limited thereto.

Electronic devices may include imaging devices, laminating devices, display devices, backlight devices, antenna devices, tiled devices, touch electronic devices (touch displays), curved electronic devices (curved displays) or non-rectangular electronic devices (free shape displays), but the present disclosure is not limited thereto. The electronic device may include, for example, liquid crystals, light emitting diodes, fluorescence, phosphors, other suitable display media, or a combination thereof, but the present disclosure is not limited thereto. The display device may be a non-self-luminous display device or a self-luminous display device, the antenna device may be a liquid crystal type antenna device or a non-liquid crystal type antenna device, and the sensing device may be a sensing device that senses capacitance, light, heat energy or ultrasonic waves; but the present disclosure is not limited thereto. The tiled device may be, for example, a tiled display device or a tiled antenna device, but the present disclosure is not limited thereto. It should be noted that the electronic device can be any combination thereof, but the present disclosure is not limited thereto. The electronic device may be a bendable or flexible electronic device. It should be noted that the electronic device can be any combination thereof, but the present disclosure is not limited thereto. In addition, the shape of the electronic device may be a rectangle, a circle, a polygon, a shape with curved edges, or other suitable shapes. The electronic devices may have peripheral systems such as drive systems, control systems, light source systems, shelf systems, etc. to support display devices, antenna devices, or tiled devices. It should be noted that the features provided by different embodiments hereinafter may be replaced, combined or used in combination, so as to constitute another embodiment without violating the spirit of the present disclosure. Features between various embodiments may be mixed and combined as long as they do not violate or conflict the spirit of the present disclosure. It should be noted that the technical solutions provided by different embodiments hereinafter may be replaced, combined or used in combination, so as to constitute another embodiment without violating the spirit of the present disclosure.

Figure 2A:
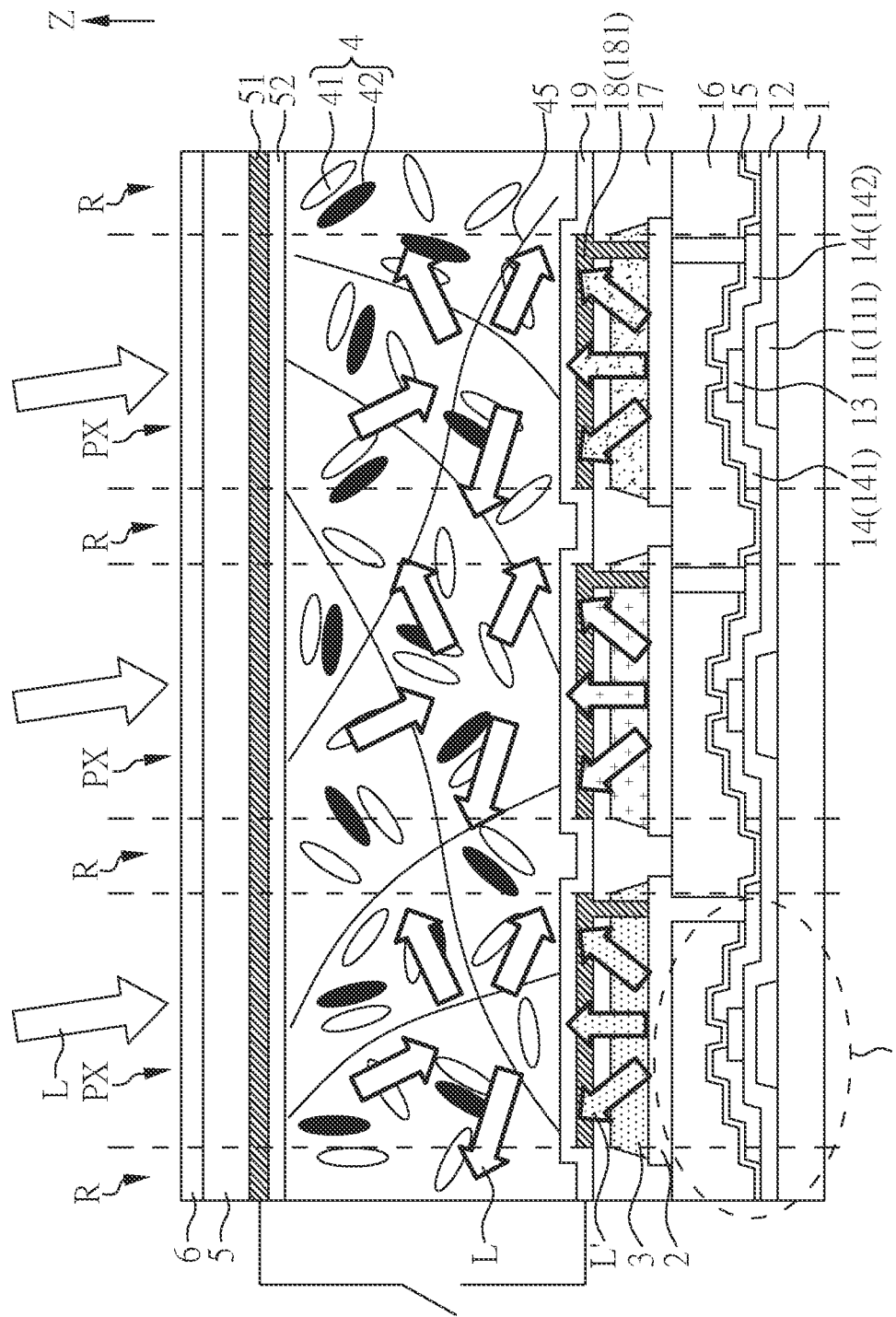
FIG. 2A and FIG. 2B are respectively schematic views of the electronic device of FIG. 1 under a non-display state and a display state.
Figure 2B:
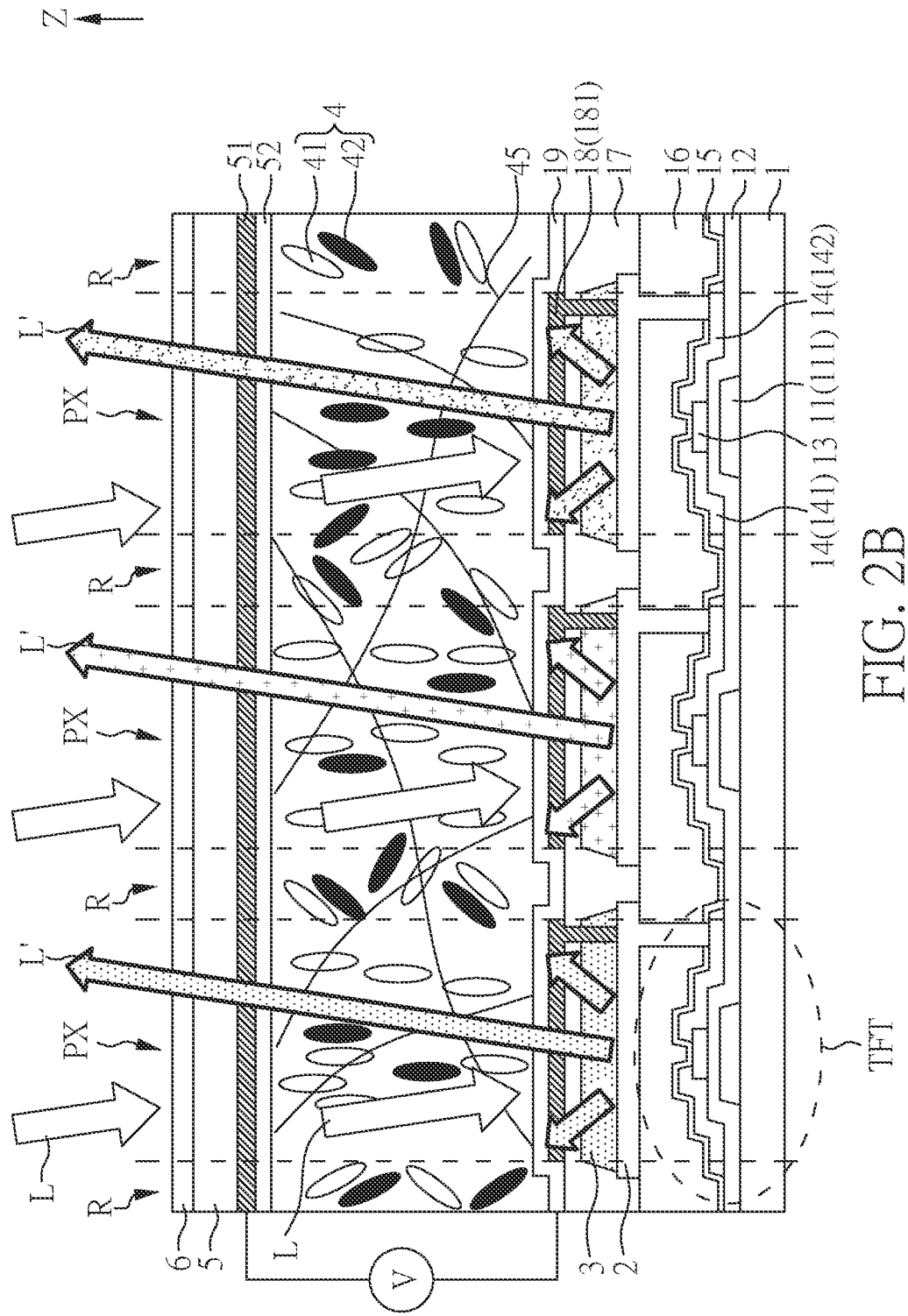

FIG. 1 is a schematic view of an electronic device according to one embodiment of the present disclosure. FIG. 2A is a schematic view of the electronic device of FIG. 1 under a non-display state. FIG. 2B is a schematic view of the electronic device of FIG. 1 under a display state.

In one embodiment of the present disclosure, as shown in FIG. 1 to FIG. 2B, the electronic device may comprise a plurality of pixel regions PX and a plurality of pixel spacing regions R and comprises: a display layer 4 disposed in the plurality of pixel regions PX and the plurality of pixel spacing regions R, and comprising a liquid crystal material 41 and a dye material 42; a plurality of reflective layers 2 respectively disposed in the plurality of pixel regions PX and disposed at one side of the display layer 4; and a plurality of color filter layers 3 respectively disposed in the plurality of pixel regions PX and disposed between the display layer 4 and the plurality of reflective layers 2. Through the above arrangement, the display layer 4 may be in a scattering state under a non-display state, and at least part of light L is scattered by the liquid crystal material 41 and absorbed by the dye material 42 when the light L passes through the display layer 4. The display layer 4 in the plurality of pixel regions PX may be in a transmissive state and the display layer 4 in the plurality of pixel spacing regions R may be in a scattering state under a display state, and at least part of light L passes through the liquid crystal material 41 and the dye material 42 in the plurality of pixel regions PX and is reflected by the plurality of reflective layers 2 when the light L passes through the display layer 4 in the plurality of pixel regions PX.

In one embodiment, when the electronic device is in the non-display state, as shown in FIG. 2A, for example, when no voltage is applied to the electronic device, the liquid crystal material 41 and the dye material 42 in the display layer 4 are, for example, irregularly arranged. At this time, the arrangement of the liquid crystal material 41 can be in a scattering state. Therefore, when the light L passes through the display layer 4, at least part or most of the light L is scattered by the liquid crystal material 41 and absorbed by the dye material 42, so that the electronic device presents the non-display state. In one embodiment, when the electronic device is in the display state, as shown in FIG. 2B, for example, when a voltage is applied to the electrode of the pixel regions PX of the electronic device, the liquid crystal material 41 and the dye material 42 in the display layer 4 in the plurality of pixel regions PX are, for example, regularly arranged. For example, the long axis direction of the liquid crystal material 41 and/or the dye material 42 may be arranged approximately along the direction of the electric field. At this time, the arrangement of the liquid crystal material 41 in the plurality of pixel regions PX may be in a transmissive state. Therefore, when the light L passes through the display layer 4 in the pixel regions PX, at least part or most of the light L may pass through the liquid crystal material 41 and the dye material 42 in the plurality of pixel regions PX and be reflected by the corresponding plurality of reflective layers 2, so that the electronic device presents the display state. The liquid crystal material 41 and the dye material 42 in the display layer 4 in the plurality of pixel spacing regions R may maintain, for example, an irregular arrangement. At this time, the arrangement of the liquid crystal material 41 in the plurality of pixel spacing regions R may be in the scattering state. Therefore, when the light L passes through the display layer 4 in the pixel spacing regions R, at least part or most of the light L in the plurality of pixel spacing regions R may be absorbed by the irregularly arranged dye material 42, so that the plurality of pixel spacing regions R present the dark state, thereby reducing the risk of light mixing between adjacent pixel regions PX and improving display quality.

In one embodiment of the present disclosure, as shown in FIG. 2A and FIG. 2B, when the light L (for example, white light) passes through the color filter layer 3, color light L', for example, may be formed. The color light L', for example, differs according to the differences in the wavebands filtered by the color filter layer 3. In the figure, the color filter layers 3 with different patterns are, for example, respectively the color filter layers that filter different wavebands (such as the color filter layers filtering red, green, blue or other suitable color band). More specifically, when the electronic device is in the non-display state, the display layer 4 in the pixel regions PX and the pixel spacing regions R, for example, is in the scattering state, and the liquid crystal material 41 and the dye material 42 in the display layer 4 in these regions are, for example, irregularly arranged. As shown in FIG. 2A, when the light L passes through the display layer 4, at least part or most of the light L, for example, is absorbed by the irregularly arranged dye material 42, while a small part of the light L that is not absorbed by the dye material 42 may pass through different color filter layers 3 to produce color light L'. After the color light L' is reflected by the plurality of reflective layers 2, the color light L' passes through the display layer 4 in the scattering state again, and most of the color light L' is absorbed by the irregularly arranged dye material 42 again, so that the electronic device presents the non-display state. When the electronic device is in the display state, the display layer 4 in the pixel regions PX is in the transmissive state (the liquid crystal material 41 and the dye material 42 are, for example, approximately vertically arranged), while the display layer 4 corresponding to the pixel spacing regions R is in the scattering state (the liquid crystal material 41 and the dye material 42 are, for example, irregularly arranged). As shown in FIG. 2B, when the light L passes through the display layer 4 in the pixel regions PX, most of the light L may pass through the display layer 4. The light L passes through the color filter layers 3 with different colors to form color light L'. After the color light L' is reflected by the reflective layers 2, the color light L' passes through the display layer 4 in the transmissive state again, so that most of the color light L' may penetrate and the image may be displayed; but the present disclosure is not limited thereto.

In one embodiment of the present disclosure, as shown in FIG. 1 to FIG. 2B, the electronic device may comprise: a first substrate 1, wherein the plurality of reflective layers 2 and the plurality of color filter layers 3 are respectively disposed on the first substrate 1, and the plurality of reflective layers 2 are respectively disposed between the first substrate 1 and the plurality of color filter layers 3; a second substrate 5 opposite to the first substrate 1; a first electrode layer 18 disposed between the first substrate 1 and the display layer 4; a second electrode layer 51 disposed between the second substrate 5 and the display layer 4, wherein the display layer 4 is disposed between the first electrode layer 18 and the second electrode layer 51. The first electrode layer 18 may comprise a plurality of first electrodes 181 respectively disposed in the plurality of pixel regions PX. In some embodiments, the plurality of first electrodes 181 may be respectively electrically connected to the plurality of reflective layers 2, and the plurality of first electrodes 181 and the second electrode layer 51 may be used to drive the display layer 4 in the plurality of pixel regions PX. For example, as shown in FIG. 2B, when a voltage is applied to the plurality of first electrodes 181 and the second electrode layer 51 of the electronic device, the liquid crystal material 41 and the dye material 42 in the display layer 4 in the plurality of pixel regions PX may be arranged regularly, so that the display layer 4 presents the transmissive state.

In the present disclosure, the "pixel regions PX" refers to, for example, the areas where the first electrodes 181 and the second electrode layer 51 are overlapped in the top view direction Z of the electronic device. The "pixel spacing regions R" refers to the area between two adjacent pixel regions PX, for example, the areas where the first electrodes 181 and the second electrode layer 51 are not overlapped in the top view direction Z of the electronic device.

In one embodiment of the present disclosure, as shown in FIG. 1 to FIG. 2B, the electronic device may further comprise: a first alignment layer 19 disposed between the first electrode layer 18 and the display layer 4; and a second alignment layer 52 disposed between the second electrode layer 51 and the display layer 4, wherein the display layer 4 is disposed between the first alignment layer 19 and the second alignment layer 52. In another embodiment of the present disclosure, the first alignment layer 19 and the second alignment layer 52 may be, for example, horizontal alignment layers; but the present disclosure is not limited thereto. When no voltage is applied to the electronic device (as shown in FIG. 2A), the liquid crystal material 41 (for example, positive liquid crystals) and the dye material 42 in the display layer 4 are, for example, irregularly arranged (such as a scattering arrangement). At this time, the arrangement of the liquid crystal material 41 in the display layer 4 may be in the scattering state, so that the electronic device may be in a non-display state. When a voltage is applied to the electrodes of the pixel regions PX (as shown in FIG. 2B), the liquid crystal material 41 (for example, positive liquid crystals) and the dye material 42 in the display layer 4 in the pixel regions PX are, for example, regularly arranged. For example, the long axis direction of the liquid crystal material 41 and/or the dye material 42 is arranged substantially parallel to the top view direction Z of the electronic device. At this time, the arrangement of the liquid crystal material 41 in the display layer 4 in the pixel regions PX may be in the transmissive state, so that the electronic device may be in the display state.

In another embodiment (not shown in the figure), the first alignment layer 19 and the second alignment layer 52 may be, for example, vertical alignment layers. Even not shown in the figure, when no voltage is applied to the electronic device, the liquid crystal material 41 (for example, negative liquid crystals) and the dye material 42 in the display layer 4 are, for example, arranged regularly. For example, the long axis direction of the liquid crystal material 41 and/or the dye material 42 is arranged substantially parallel to the top view direction Z of the electronic device. At this time, the arrangement of the liquid crystal material 41 (for example, negative liquid crystals) in the display layer 4 may be in the transmissive state, so that the electronic device may be in the display state. When a voltage is applied to the electrode of the pixel regions PX, the arrangement of the liquid crystal material 41 (for example, negative liquid crystal) and the dye material 42 in the display layer 4, for example, may be adjusted. At this time, the arrangement of the liquid crystal material 41 in the display layer 4 may be in the scattering state, so that the electronic devices may be in the non-display state.

In one embodiment of the present disclosure, as shown in FIG. 1 to FIG. 2B, the electronic device may comprise: a first conductive layer 11 disposed on the first substrate 1 and comprising a plurality of gate electrodes 111; a first insulating layer 12 disposed on the first conductive layer 11; a plurality of active layers 13 disposed on the first insulating layer 12 and respectively disposed correspondingly to the plurality of gate electrodes 111; a second conductive layer 14 disposed on the plurality of active layers 13 and comprising a plurality of source electrodes 141 and a plurality of drain electrodes 142, wherein one of the plurality of source electrodes 141 and one of the plurality of drain electrodes 142 are respectively electrically connected to one of the plurality of active layers 13. Herein, one of the plurality of gate electrodes 111, the first insulating layer 12, one of the plurality of active layers 13, one of the plurality of source electrodes 141 and one of the plurality of drain electrodes 142 form a transistor TFT. It should be noted that the structure of the transistor TFT in the figure is only an example and can be adjusted to other stacked transistors (such as double gate or top gate transistor) according to needs. In one embodiment, a second insulating layer 15 is disposed on the second conductive layer 14; a passivation layer 16 is disposed on the second insulating layer 15, wherein the plurality of reflective layers 2 are disposed on the passivation layer 16, and the plurality of reflective layers 2 are respectively electrically connected to one of the plurality of the drain electrodes 142 through a plurality of vias H; and a planer layer 17 disposed on the plurality of color filter layers 3 and the plurality of reflective layers 2, wherein the plurality of first electrodes 181 are disposed on the planer layer 17, and the planer layer 17 is disposed between the plurality of first electrodes 181 and the plurality of color filter layers 3. In the present disclosure, when the reflective layers 2 are electrically connected to the first electrodes 181, the reflective layers 2 may be used to drive the display layer 4. More specifically, the plurality of reflective layers 2 may be respectively electrically connected to the plurality of transistors TFT, the plurality of reflective layers 2 may be respectively electrically connected to the plurality of first electrodes 181, and the plurality of reflective layers 2 may respectively transmit signals transmitted by the plurality of transistors TFT to the first electrodes 181 electrically connected thereto. Thus, the plurality of first electrodes 181 may respectively drive the display layer 4 in the plurality of pixel regions PX, and the arrangement of the liquid crystal material 41 and the dye material 42 in the display layer 4 in the pixel regions PX may be adjusted.

In one embodiment of the present disclosure, as shown in FIG. 1, two adjacent color filter layers 3 of the plurality of color filter layers 3 are separated by a first gap D1, and two adjacent first electrodes 181 of the plurality of first electrodes 181 are separated by a second gap D2. The width D1-W of the first gap D1 may be, for example, less than or equal to the width D2-W of the second gap D2 to increase the proportion of light L (shown in FIG. 2A) that is filtered by the color filter layer 3, but the present disclosure is not limited thereto. In one embodiment of the present disclosure, as shown in FIG. 1, two adjacent reflective layers 2 of the plurality of reflective layers 2 are separated by a third gap D3, and the width D3-W of the third gap D3 may be, for example, less than or equal to the width D1-W of the first gap D1 to increase the proportion of light L (shown in FIG. 2A) reflected by reflective layer 2, but the present disclosure is not limited thereto. It should be noted that the width of the gap between two adjacent components is, for example, the minimum width of the gap in the top view (not shown), but the present disclosure is not limited thereto. Alternatively, the width of the gap between two adjacent components may be determined by measuring the minimum width of the gap between two adjacent components in a cross-section. It should be noted that the width D1-W of the first gap D1 may be, for example, less than or equal to the width D2-W of the second gap D2. The width D1-W and the width D2-W are, for example, measured from the same cross-section, or measured on the same section line (not shown) from the top view (not shown). It should be noted that the width D3-W of the third gap D3 may be, for example, less than or equal to the width D1-W of the first gap D1. The width D3-W and the width D1-W are, for example, measured from the same cross-section, or measured on the same section line (not shown) from the top view (not shown).

In the present disclosure, the same or different materials may be used to prepare the first substrate 1 and the second substrate 5. The materials of the first substrate 1 and the second substrate 5 may respectively include glass, quartz, sapphire, ceramic, polycarbonate (PC), polyimide (PI), polyethylene terephthalate (PET), polymethylmethacrylate (PMMA), other suitable substrate materials or a combination thereof, but the present disclosure is not limited thereto.

In the present disclosure, the same or different materials may be used to prepare the first conductive layer 11 and the second conductive layer 14. The materials of the first conductive layer 11 and the second conductive layer 14 may respectively include a metal, a metal oxide, an alloy thereof, or a combination thereof. For example, they may be gold, silver, copper, palladium, platinum, ruthenium, aluminum, cobalt, nickel, titanium, molybdenum, manganese, indium zinc oxide (IZO), indium tin oxide (ITO), indium tin zinc oxide (ITZO), indium gallium zinc oxide (IGZO), or aluminum zinc oxide (AZO), but the present disclosure is not limited thereto. It should be noted that in the present disclosure, the first electrode layer 18 (the first electrodes 181) and the second electrode layer 51 may be prepared, for example, by transparent conductive materials.

In the present disclosure, the same or different materials may be used to prepare the first insulating layer 12, the second insulating layer 15, the passivation layer 16 and the planer layer 17. The materials of the first insulating layer 12, the second insulating layer 15, the passivation layer 16 and the planer layer 17 may respectively include silicon nitride, silicon oxide, silicon oxynitride, silicon carbonitride or a combination thereof, but the present disclosure is not limited thereto. In the present disclosure, the passivation layer 16 and the planer layer 17 may comprise, for example, a transparent organic insulating layer, but the present disclosure is not limited thereto. In the present disclosure, the material of the active layer 13 may include amorphous silicon, polycrystalline silicon (such as low-temperature polycrystalline silicon (LTPS)), or oxide semiconductor (such as indium gallium zinc oxide (IGZO) or indium gallium oxide (IGO)), but the present disclosure is not limited thereto.

In the present disclosure, the material of the reflective layer 2 is a conductive material with the function of reflecting light, for example, may comprise a metal, an alloy thereof or a combination thereof. Suitable metals are, for example, gold, silver, copper, palladium, platinum, ruthenium, aluminum, cobalt, nickel, titanium, molybdenum or manganese, but the present disclosure is not limited thereto. In the present disclosure, the color filter layers 3 may include a red color filter layer, a green color filter layer, a blue color filter layer, color filter layers with other suitable color, or a combination thereof, but the present disclosure is not limited thereto. Therefore, when the light L passes through the color filter layer 3 that can be used to filter light in different color bands, corresponding color light L' can be formed.

In the present disclosure, the display layer 4 comprises, for example, guest-host liquid crystals (GHLCs) with a scattering state. The liquid crystal material 41 in the display layer 4 may comprise, for example, polymer network liquid crystals (PNLCs), polymer dispersed liquid crystals (PDLCs), cholesteric liquid crystals (CHLCs), polymer stabilized cholesteric textures (PSCTs), other suitable liquid crystal material or a combination thereof, but the present disclosure is not limited thereto. In one embodiment of the present disclosure, as shown in FIG. 1, the display layer 4 comprises, for example, polymer network liquid crystals (PNLCs) as an example, but the present disclosure is not limited thereto. In addition, the display layer 4 comprises the liquid crystal material 41, a polymer 45 and the dye material 42, but the present disclosure is not limited thereto.

In the present disclosure, the dye material 42 may include a dichroic dye, and may have absorptivity for light with wavelengths ranging from, for example, 360 nm to 830 nm, but the present disclosure is not limited thereto. The color absorbed by the dye material 42 may include, for example, black, red, green, purple, orange, blue, other colors, or a combination thereof, but the present disclosure is not limited thereto. In the present disclosure, when the arrangement of the long axis direction of the liquid crystal material 41 and/or the dye material 42 is, for example, substantially perpendicular to the polarization direction of the incident light L, the incident light L is not easily absorbed by the dye material 42, and most of the light L may pass through the display layer 4, making the electronic device present the display state. On the contrary, when the arrangement of the long axis direction of the liquid crystal material 41 and/or the dye material 42 is, for example, not perpendicular to the polarization direction of the incident light L, for example, the long axis direction of the liquid crystal material 41 and/or the dye material 42 is parallel to the polarization direction of the incident light L, the incident light L is easily absorbed by the dye material 42, making the electronic device present the dark state or the non-display state.

In one embodiment of the present disclosure, as shown in FIG. 1, the electronic device may further comprise an anti-glare layer 6, which may be disposed at one side of the second substrate 5 away from the first substrate 1 (or the display layer 4) and adjacent to the viewing side. The anti-glare layer 6 can be used to block most of the horizontally polarized light in the external light L to reduce the horizontally polarized light passing through the display layer 4 and then being reflected by the reflective layer 2 to the viewer, thereby reducing glare. In the present disclosure, the anti-glare layer 6 includes, for example, an anti-glare film. The anti-glare film may be attached to the second substrate 5 through an adhesive layer (not shown), or the anti-glare layer 6 may, for example, include an anti-glare coating layer which is formed by treating the surface of one side of the second substrate 5 away from the first substrate 1, but the present disclosure in not limited thereto.

Figure 3:
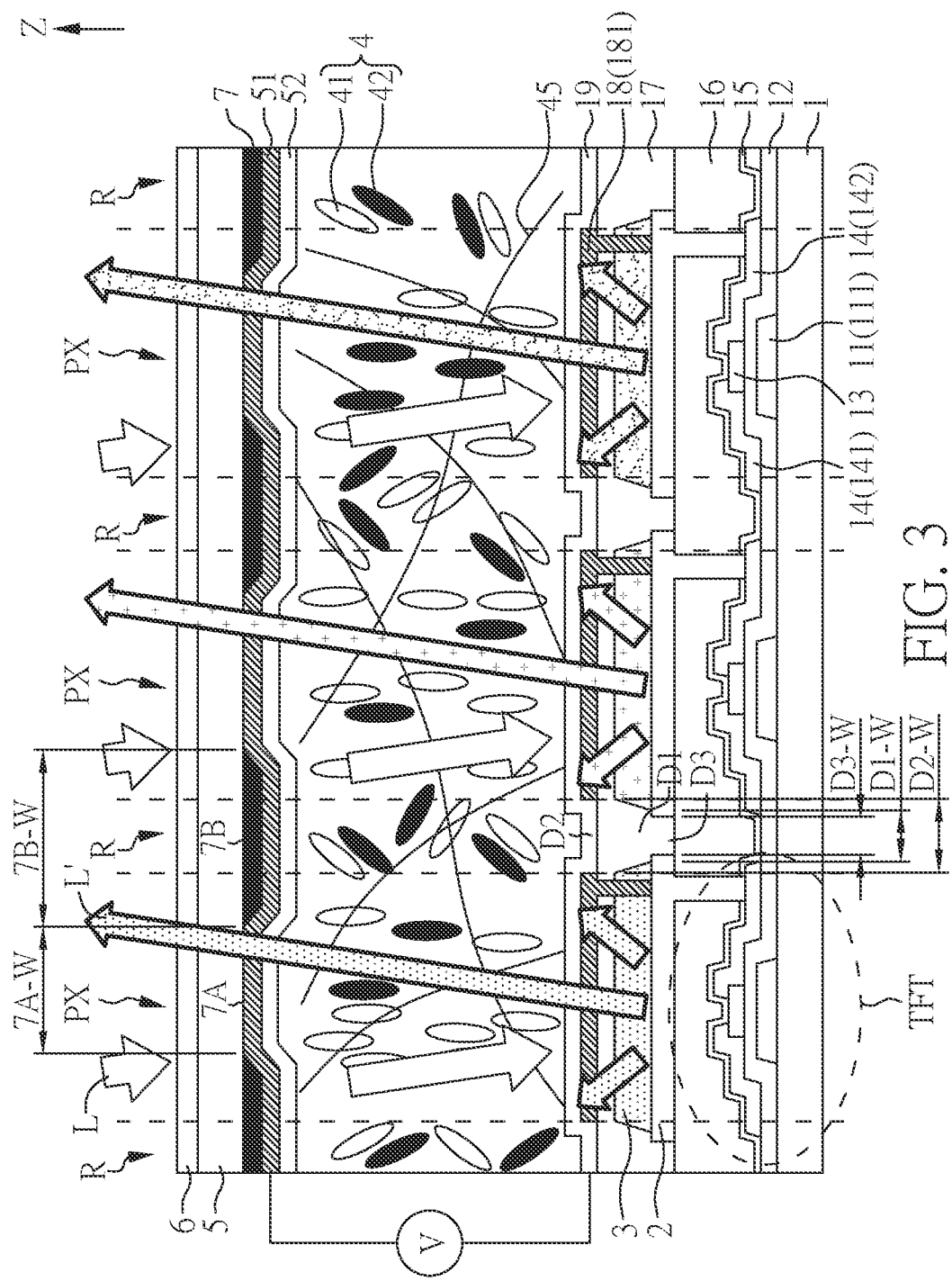
FIG. 3 is a schematic view of an electronic device according to one embodiment of the present disclosure.

FIG. 3 is a schematic view of an electronic device according to one embodiment of the present disclosure. The electronic device in FIG. 3 is similar to that shown in FIG. 1 and FIG. 2B, except for the following differences.

In one embodiment of the present disclosure, as shown in FIG. 3, the electronic device may further comprise a light shielding layer 7 having a plurality of opening parts 7A and a plurality of light shielding parts 7B, wherein the plurality of opening parts 7A are disposed in the plurality of pixel regions PX, and the plurality of light shielding parts 7B are disposed in the plurality of pixel spacing regions R. In the top view direction Z of the electronic device, the display layer 4 is disposed between the light shielding layer 7 and the color filter layers 3. The light shielding layer 7 can be used to absorb part of the reflected color light L', reduce the risk of light mixing between adjacent pixel regions PX, and improve the display quality.

In one embodiment of the present disclosure, as shown in FIG. 3, in the top view direction Z of the electronic device, the plurality of opening parts 7A of the light shielding layer 7 and the plurality of pixel regions PX may be overlapped, and the plurality of light shielding parts 7B of the light shielding layer 7 and the plurality of pixel spacing regions R may be overlapped. In the top view direction Z of the electronic device, the plurality of light shielding parts 7B of the light shielding layer 7 and the plurality of pixel regions PX may be selectively partially overlapped. In one embodiment of the present disclosure, as shown in FIG. 3, the light shielding layer 7 may be disposed between the second substrate 5 and the second electrode layer 51, but the present disclosure is not limited thereto.

In one embodiment of the present disclosure, as shown in FIG. 3, in the top view direction Z of the electronic device, one of the plurality of light shielding parts 7B and the first gap D1 (the gap between two adjacent color filter layers 3 of the plurality of color filter layers 3) are overlapped, and the width 7B-W of the one of the plurality of light shielding parts 7B may be greater than or equal to the width D1-W of the first gap D1. In one embodiment of the present disclosure, as shown in FIG. 3, one of the plurality of light shielding parts 7B and the second gap D2 (the gap between two adjacent first electrodes 181 of the plurality of first electrodes 181) are overlapped, and the width 7B-W of the one of the plurality of light shielding parts 7B is greater than or equal to the width D2-W of the second gap D2. In one embodiment of the present disclosure, as shown in FIG. 3, one of the plurality of light shielding parts 7B and the third gap D3 are overlapped, and the width 7B-W of the one of the plurality of light shielding parts 7B is greater than or equal to the width D3-W of the third gap D3. In one embodiment of the present disclosure, as shown in FIG. 3, the width 7A-W of the opening part 7A of the light shielding layer 7 is, for example, less than the width of the reflective layer 2 (not shown) and the width of the first electrode 181 (not shown).

In the present disclosure, the material of the light shielding layer 7 may include a black conductive layer or a metal layer (such as molybdenum oxide, copper oxide, other suitable materials or a combination thereof), a black insulating layer (including a black ink layer or a black resin layer), but the present disclosure is not limited thereto.

Figure 4:
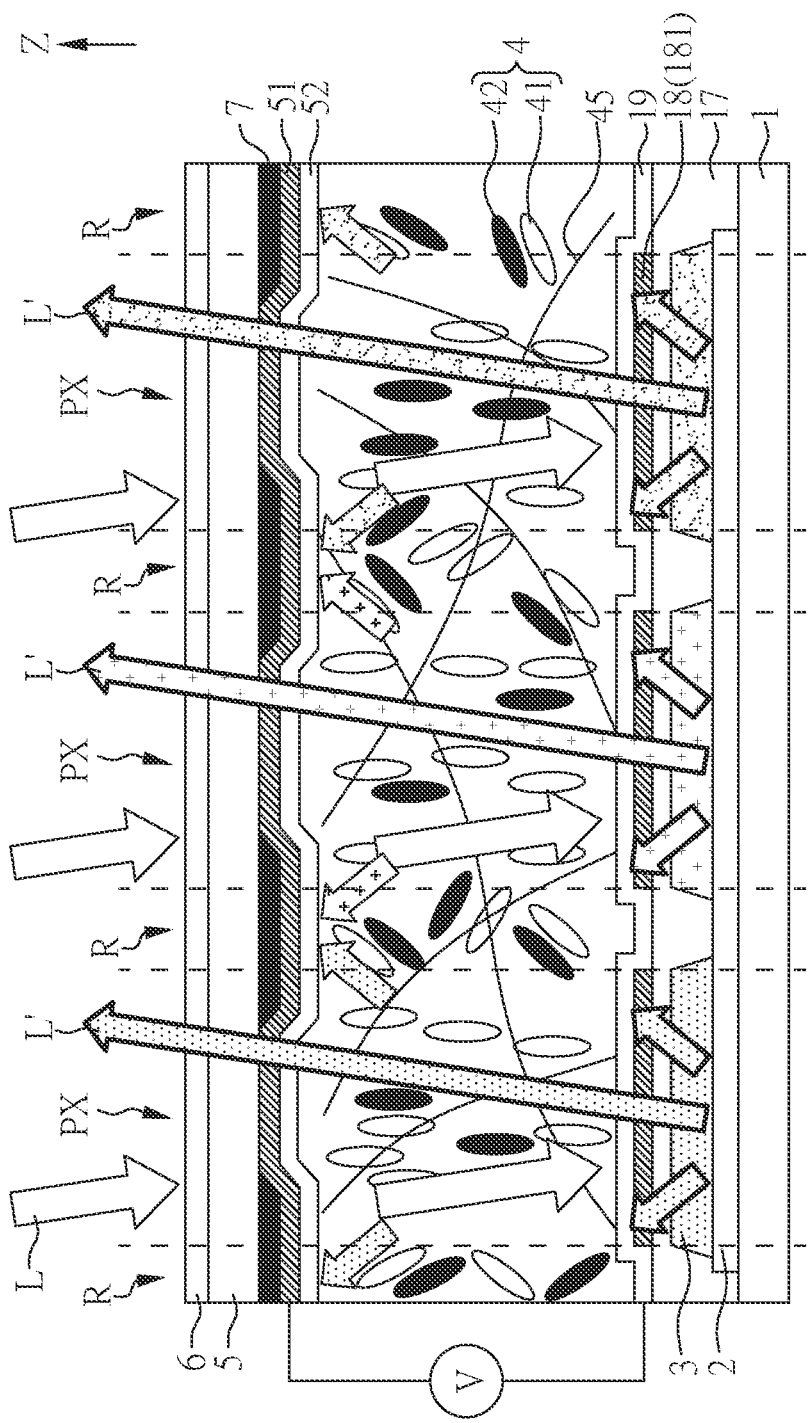
FIG. 4 is a schematic view of an electronic device according to one embodiment of the present disclosure.

FIG. 4 is a schematic view of an electronic device according to one embodiment of the present disclosure. The electronic device in FIG. 4 is similar to that shown in FIG. 3, except for the following differences.

In one embodiment of the present disclosure, the electronic device may be a passive electronic (display) device. Thus, as shown in FIG. 4, the electronic device may comprise: a first substrate 1; a reflective layer 2 disposed between the first substrate 1 and the display layer 4; a plurality of color filter layers 3 disposed on the reflective layer 2; a planer layer 17 disposed on the plurality of color filter layers 3 and the reflective layer 2; and a first electrode layer 18 disposed on the planer layer 17 and comprising a plurality of first electrodes 181 respectively disposed in the plurality of pixel regions PX. By applying a voltage to the first electrode layer 18 (for example, the first electrode 181) and the second electrode layer 51 to, for example, generate an electric field (for example, a vertical electric field), the display layer 4 can be driven and, for example, the liquid crystal material 41 and the dye material 42 in the display layer 4 can be controlled. Therefore, the display layer 4 can be switched to the transmissive state or the scattering state so that the electronic device presents the display state or the non-display state. The state switching of the display layer 4 between no voltage applied and voltage applied (such as the transmissive state or the scattering state) may be different according to the type of the liquid crystal material 41 selected for the display layer 4 (such as positive or negative liquid crystals), which can be referred to the above description.

In the present embodiment, as shown in FIG. 4, the reflective layer 2 may be a whole-surface reflective layer, which can improve the effect of the light L passing through the display layer 4 being reflected by the reflective layer 2. In the present embodiment, since the plurality of first electrodes 181 are not electrically connected to the reflective layer 2, at this time, in addition to the above-mentioned conductive material with the function of reflecting the light L (such as a metal reflective material), the material of the reflective layer 2 may be a non-conductive material having the function of reflecting the light L, such as a white material layer (for example, white ink). The white material layer may include polyimide, resin, other suitable materials, or a combination thereof, but the present disclosure is not limited thereto. In the present disclosure, since the plurality of first electrodes 181 are not electrically connected to the reflective layer 2, the reflective layer 2 may also be selectively disposed on the entire surface of the first substrate 1, that is, the reflective layer 2 may overlap the plurality of pixel regions PX and the plurality of pixel spacing regions R at the same time.

Figure 5:
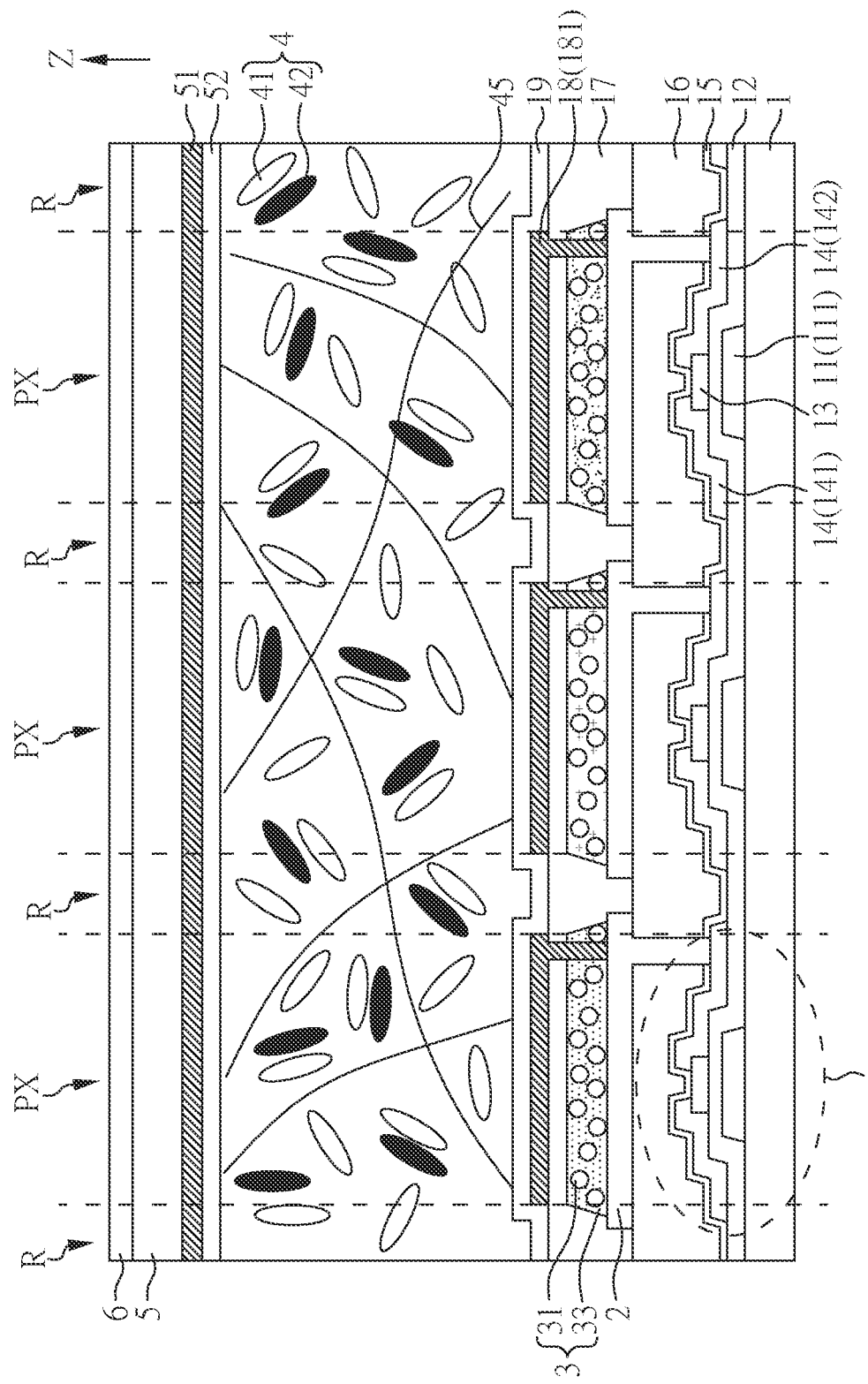
FIG. 5 is a schematic view of an electronic device according to one embodiment of the present disclosure.

FIG. 5 is a schematic view of an electronic device according to one embodiment of the present disclosure. The electronic device in FIG. 5 is similar to that shown in FIG. 1, except for the following differences.

In one embodiment of the present disclosure, as shown in FIG. 5, the plurality of color filter layers 3 may respectively comprise a filter material 33 and a quantum dot material 31. When the light L (as shown in FIG. 2B) passes through the plurality of color filter layers 3, the quantum dot material 31 in the plurality of color filter layers 3 may be used to receive light with specific wavelengths and convert it into the corresponding color light. For example, the quantum dot material 31 can absorb light in the blue band (or other short-wavelength bands) and convert it into light, for example, in the red or green band, and the color purity of the reflected light may be improved.

Figure 6:
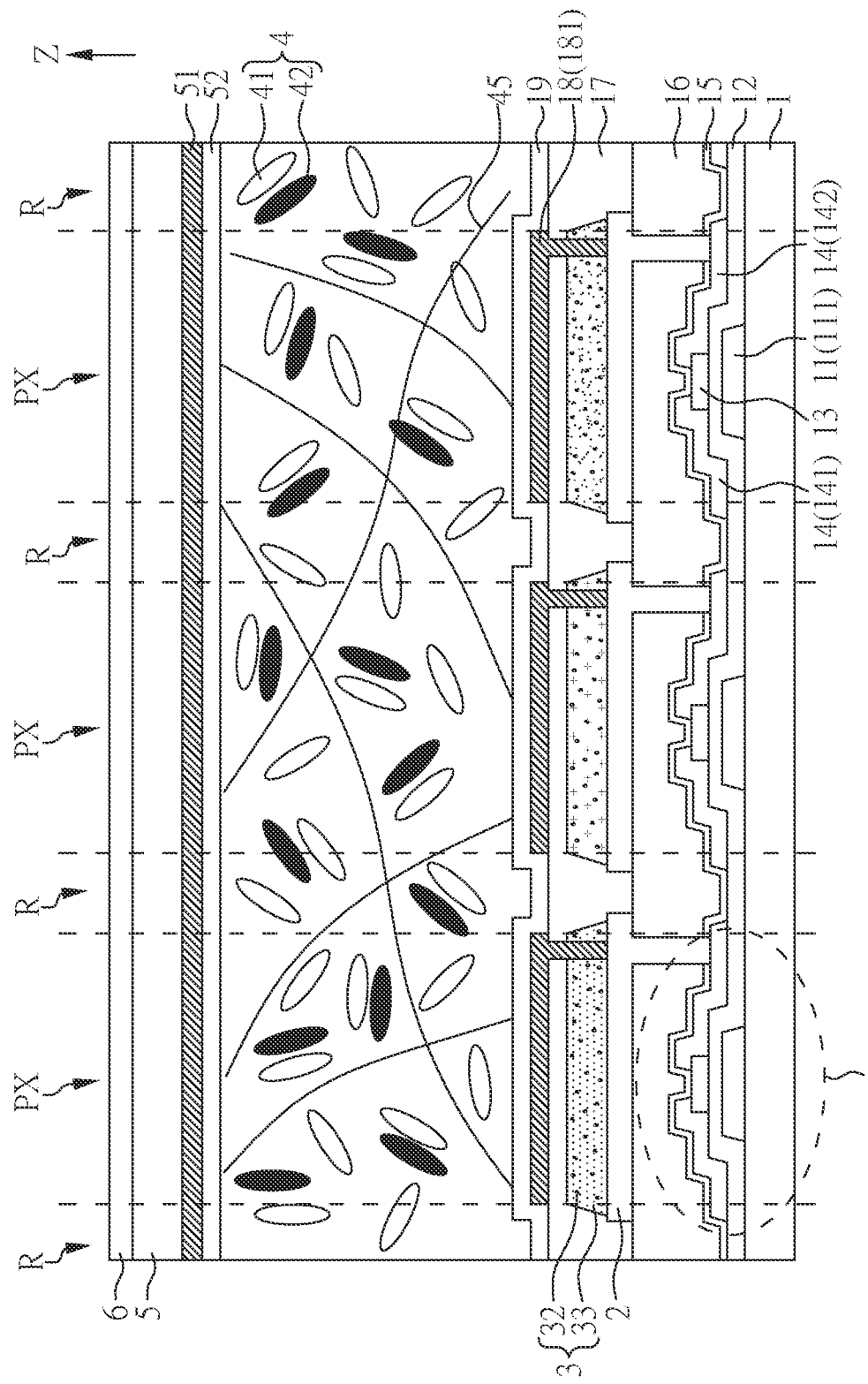
FIG. 6 is a schematic view of an electronic device according to one embodiment of the present disclosure.

FIG. 6 is a schematic view of an electronic device according to one embodiment of the present disclosure. The electronic device in FIG. 6 is similar to that shown in FIG. 1, except for the following differences.

In one embodiment of the present disclosure, as shown in FIG. 6, the plurality of color filter layers 3 may respectively comprise a filter material 33 and a reflective material 32. When the light L (as shown in FIG. 2B) passes through the plurality of color filter layers 3, the reflective material 32 in the plurality of color filter layers 3 may be used to increase the reflection efficiency of the light L (as shown in FIG. 2B), thereby increasing the amount of light emitted by the electronic device.

In some embodiments, the reflective material 32 may include pigment, such as white pigment or other suitable materials. The reflective material 32 may include, for example, titanium dioxide, aluminum oxide, zinc oxide, zirconium oxide, other suitable materials, or a combination thereof, but the present disclosure is not limited thereto. In the present disclosure, the refractive index n1 of the reflective material 32 may be greater than the refractive index n2 of the filter material 33, and the difference in the refractive index between the reflective material 32 and the filter material 33 may be greater than or equal to 0.3 (that is, $n1-n2 \geq 0.3$), which may increase the amount of light emitted by the electronic device, but the present disclosure is not limited thereto. In some embodiments, the difference in the refractive index between the reflective material 32 and the filter material 33 may be greater than or equal to 0.25 (that is, $n1-n2 \geq 0.25$). In some embodiments, the difference in the refractive index between the reflective material 32 and the filter material 33 may be greater than or equal to 0.2 (that is, $n1-n2 \geq 0.2$).

Figure 7:
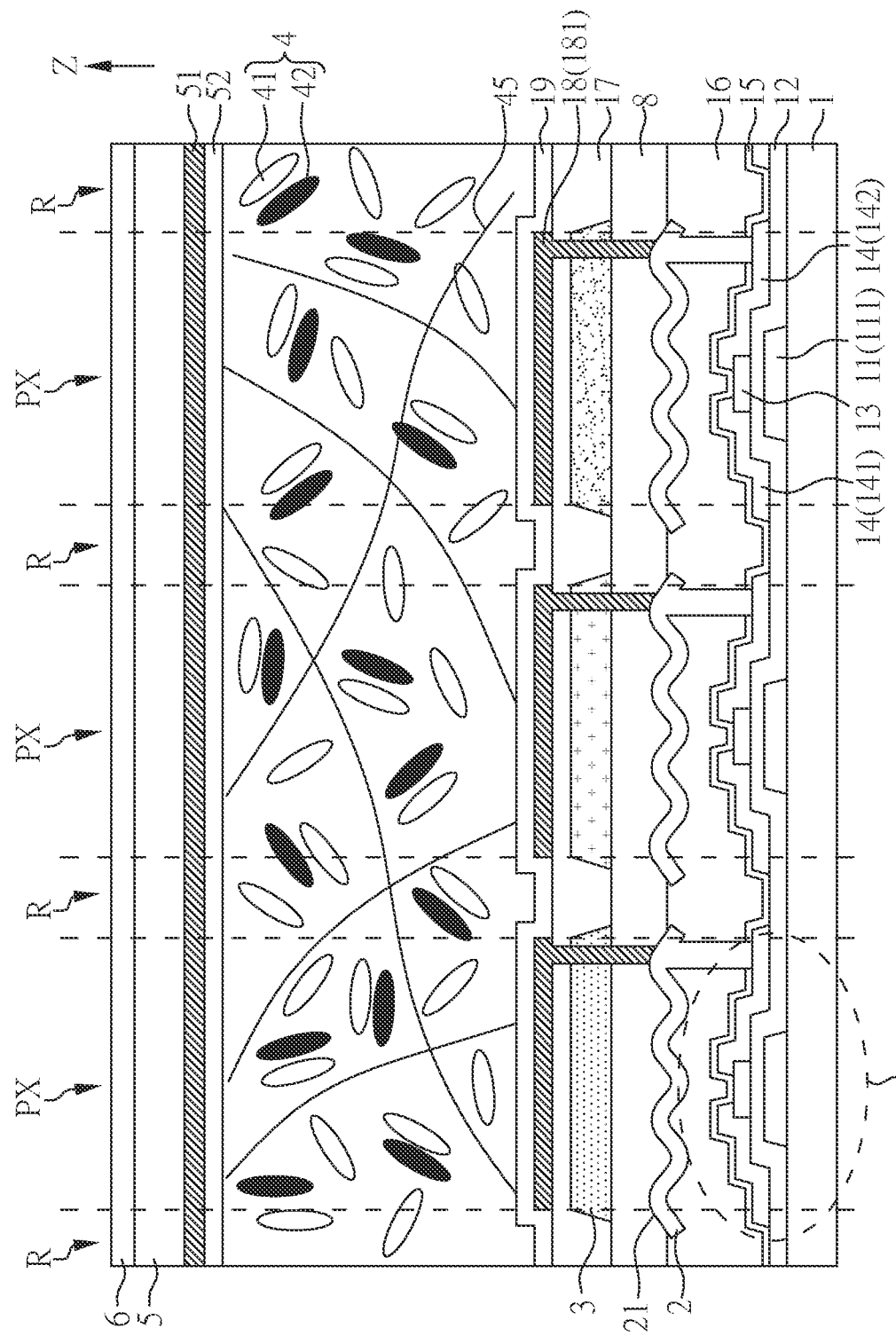
FIG. 7 is a schematic view of an electronic device according to one embodiment of the present disclosure.

FIG. 7 is a schematic view of an electronic device according to one embodiment of the present disclosure. The electronic device in FIG. 7 is similar to that shown in FIG. 1, except for the following differences.

In one embodiment of the present disclosure, as shown in FIG. 7, the plurality of reflective layers 2 may respectively have an uneven surface 21 (for example, it may be a rough surface). The uneven surface 21 may increase the angle of reflected light and expand the viewing angle of the electronic device.

In one embodiment of the present disclosure, as shown in FIG. 7, the electronic device may comprise a light transmitting layer 8 disposed between the plurality of color filter layers 3 and the plurality of reflective layers 2. In the present disclosure, the material of the light transmitting layer 8 may include silicon nitride, silicon oxide, silicon oxynitride, silicon carbonitride or a combination thereof, but the present disclosure is not limited thereto.

Figure 8:
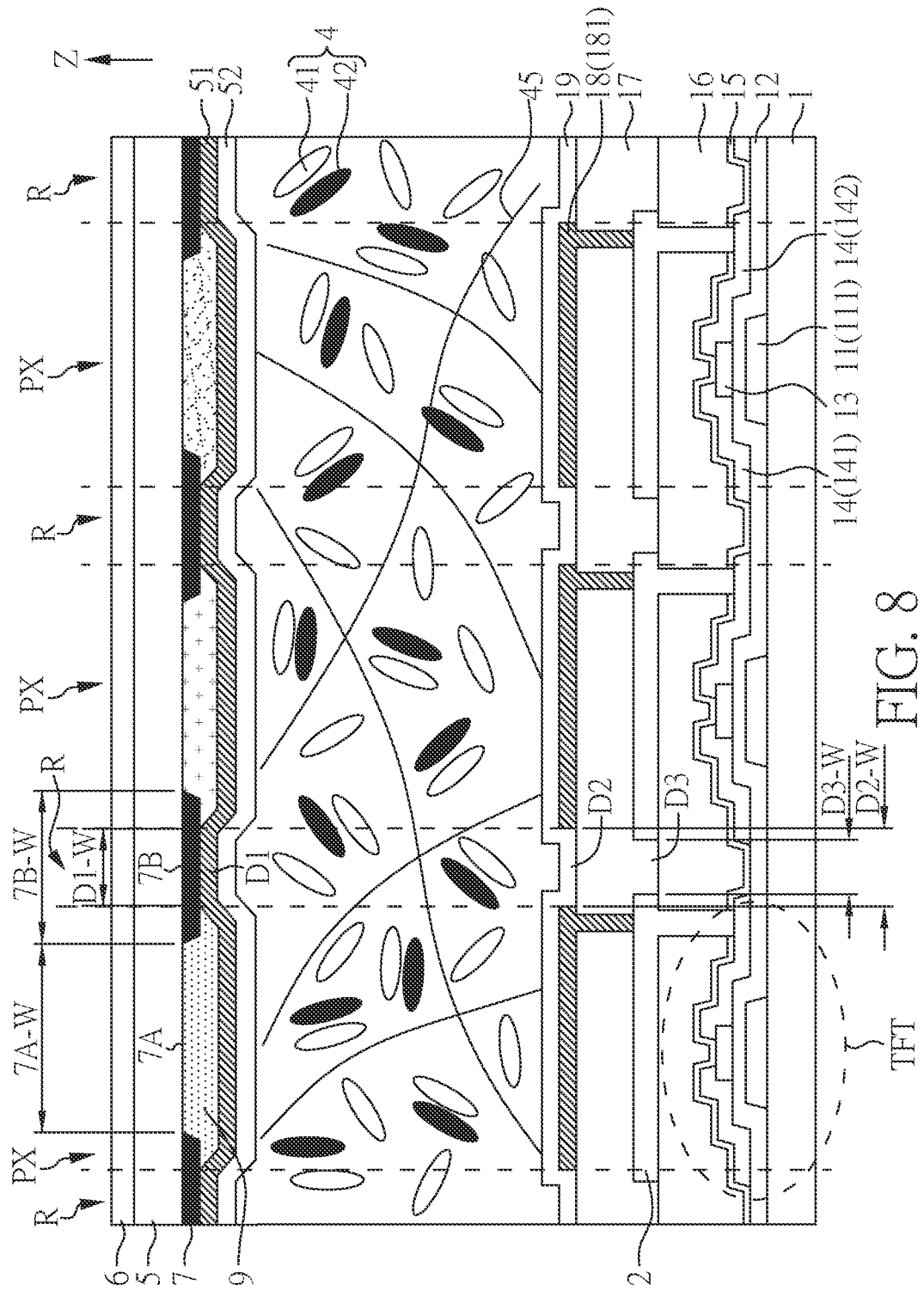
FIG. 8 is a schematic view of an electronic device according to one embodiment of the present disclosure.
Figure 9A:
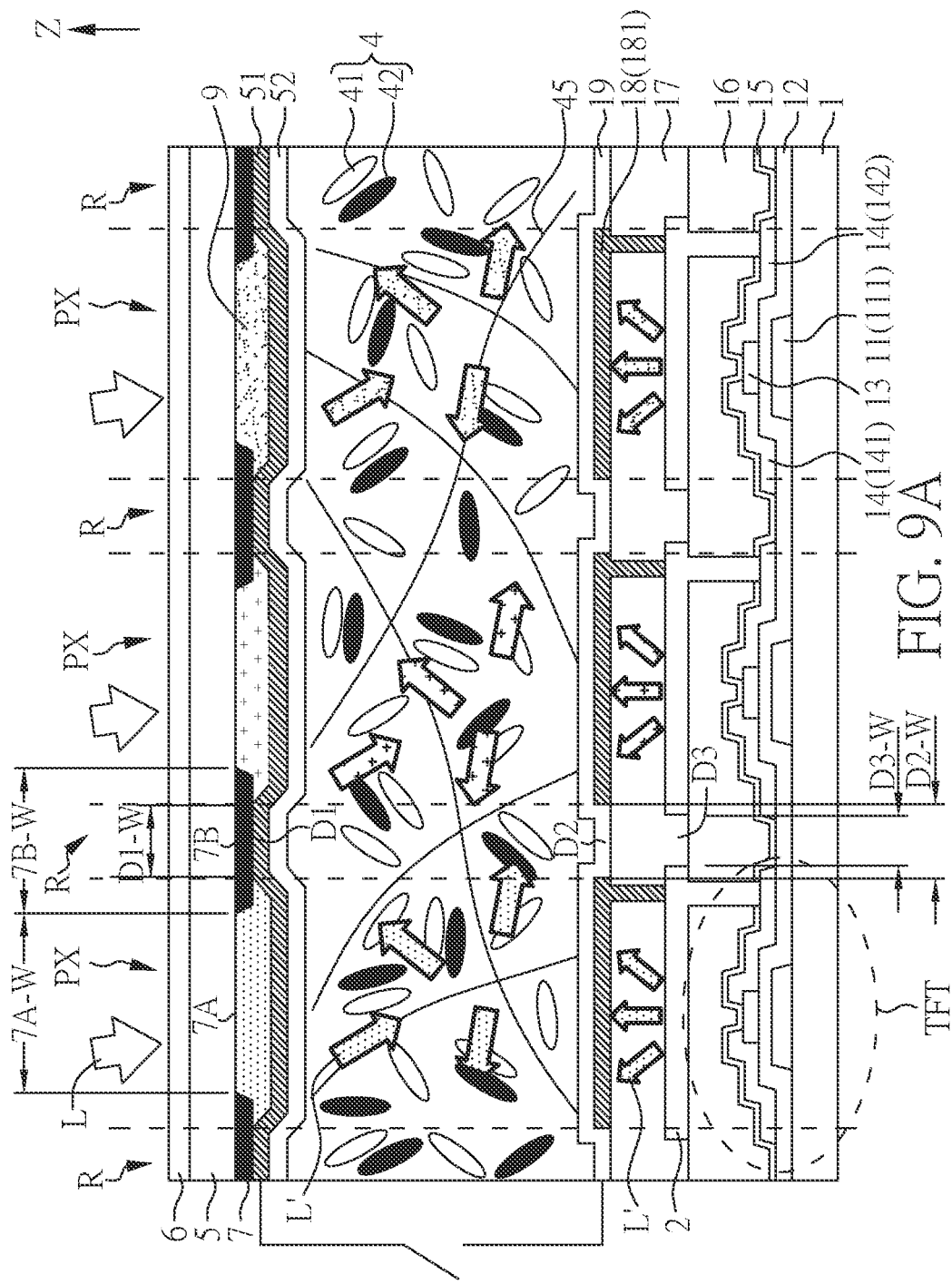
FIG. 9A and FIG. 9B are respectively schematic views of the electronic device of FIG. 8 under a non-display state and a display state.
Figure 9B:
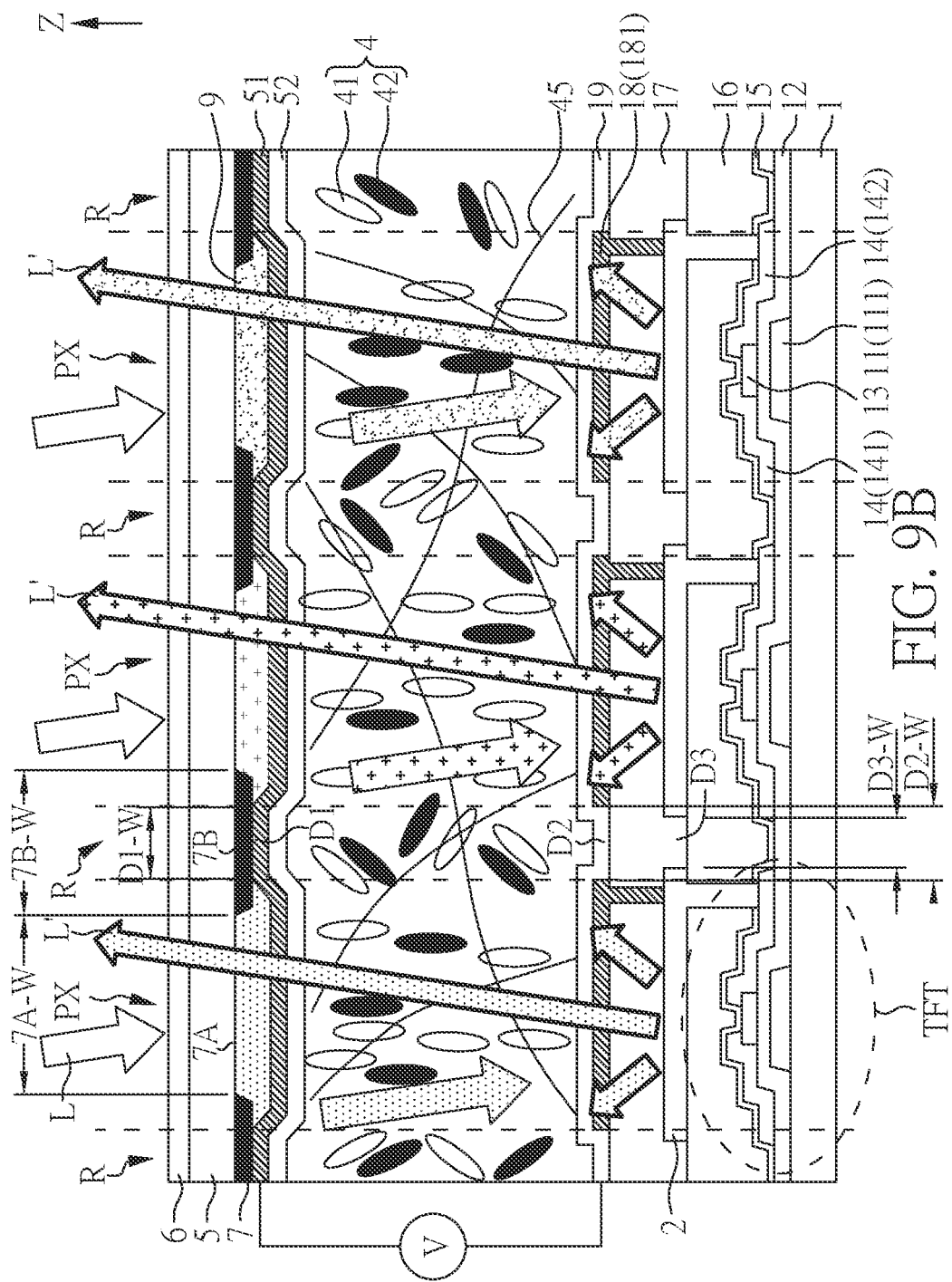

FIG. 8 is a schematic view of an electronic device according to one embodiment of the present disclosure. FIG. 9A is a schematic view of the electronic device of FIG. 8 under a non-display state. FIG. 9B is a schematic view of the electronic device of FIG. 8 under a display state. The electronic device in FIG. 8 is similar to that shown in FIG. 1, except for the following differences.

In one embodiment of the present disclosure, as shown in FIG. 8 to FIG. 9B, the electronic device may comprise a plurality of pixel regions PX and a plurality of pixel spacing regions R, and comprise: a display layer 4 disposed in the plurality of pixel regions PX and the plurality of pixel spacing regions R and comprising a liquid crystal material 41 and a dye material 42; a plurality of reflective layers 2 respectively disposed in the plurality of pixel regions PX and disposed at one side of the display layer 4; and a plurality of color filter layers 9 respectively disposed in the plurality of pixel regions PX and disposed at one side of the display layer 4 away from the plurality of reflective layers 2. Through the above arrangement, the display layer 4 is in a scattering state under a non-display state of the electronic device, and at least part of light L is scattered by the liquid crystal material 41 and absorbed by the dye material 42 when the light L passes through the display layer 4. The display layer 4 in the plurality of pixel regions PX is in a transmissive state and the display layer 4 in the plurality of pixel spacing regions R is in a scattering state under a display state of the electronic device, and at least part of light L passes through the liquid crystal material 41 and the dye material 42 in the plurality of pixel regions PX and is reflected by the plurality of reflective layers 2 when the light L passes through the display layer 4 in the plurality of pixel regions PX.

In one embodiment of the present disclosure, as shown in FIG. 9A and FIG. 9B, the plurality of color filter layers 9 are disposed between the second substrate 5 and the display layer 4. When the electronic device presents the non-display state, as shown in FIG. 9A, for example, when no voltage is applied to the electrodes of the electronic device, the liquid crystal material 41 and dye material 42 in the display layer 4 are, for example, arranged irregularly. At this time, the arrangement of the liquid crystal material 41 can be in a scattering state. Therefore, when the color light L' formed after the light L passes through the color filter layer 9 passes through the display layer 4, at least part or most of the color light L' will be absorbed by the irregularly arranged dye material 42, causing the electronic device to present in the non-display state. In one embodiment, when the electronic device presents the display state, as shown in FIG. 9B, for example, when a voltage is applied to the electrodes of the electronic device, the liquid crystal material 41 and dye material 42 in the display layer 4 in the plurality of pixel regions PX are, for example, arranged regularly, for example, the arrangement of the long axis direction of the liquid crystal material 41 and/or the dye material 42 is, for example, substantially arranged along the direction of the electric field. At this time, the arrangement of the liquid crystal material 41 in the plurality of pixel regions PX can be in the transmissive state. Therefore, when the color light L' formed after the light L passes through the color filter layer 9 passes through the display layer 4, at least part or most of the color light L' may pass through the liquid crystal material 41 and the dye material 42 in the plurality of pixel regions PX, that is, most of the color light L' in the plurality of pixel regions PX can pass through the display layer 4 and be reflected by the corresponding reflective layers 2 of the plurality of reflective layers 2, so that the electronic device presents the display state. The liquid crystal material 41 and the dye material 42 in the display layer 4 in the plurality of pixel spacing regions R may, for example, maintain an irregular arrangement. At this time, the arrangement of the liquid crystal material 41 in the plurality of pixel spacing regions R may be in the scattering state. Therefore, when the color light L' passes through the display layer 4 in the pixel spacing regions R, most of the color light L' will be absorbed by the dye material 42, making the plurality of pixel spacing regions R present in the dark state, thus reducing the risk of light mixing between adjacent pixel regions PX and improving the display quality.

In one embodiment of the present disclosure, as shown in FIG. 8 to FIG. 9B, the electronic device may further comprise a light shielding layer 7 having a plurality of opening parts 7A and a plurality of light shielding parts 7B, wherein the plurality of opening parts 7A are disposed in the plurality of pixel regions PX, the plurality of light shielding parts 7B are disposed in the plurality of pixel spacing regions R, and the plurality of color filter layers 9 and the plurality of opening parts 7A of the light shielding layer 7 are respectively overlapped. The light shielding layer 7 can be used to absorb the partially reflected color light L', reduce the risk of light mixing between adjacent pixel regions PX, and improve the display quality.

In one embodiment of the present disclosure, as shown in FIG. 8 to FIG. 9B, in the top view direction Z of the electronic device, the plurality of opening parts 7A of the light shielding layer 7 and the plurality of pixel regions PX may be overlapped, and the plurality of light shielding parts 7B of the light shielding layer 7 and the plurality of pixel spacing regions R may be overlapped. In addition, in the top view direction Z of the electronic device, the plurality of light shielding parts 7B of the light shielding layer 7 and the plurality of pixel regions PX may be selectively partially overlapped. In one embodiment of the present disclosure, as shown in FIG. 8, the light shielding layer 7 may be disposed on the second substrate 5, and the light shielding layer 7 may be disposed between the second substrate 5 and the second electrode layer 51, but the present disclosure is not limited thereto. In other embodiments, the light shielding layer 7 may be disposed between the second substrate 5 and the display layer 4.

In one embodiment of the present disclosure, as shown in FIG. 8 to FIG. 9B, two adjacent color filter layers 9 of the plurality of color filter layers 9 are separated by a first gap D1, one of the plurality of light shielding parts 7B and the first gap D1 are overlapped, and the width 7B-W of the one of the plurality of light shielding parts 7B is greater than or equal to the width D1-W of the first gap D1. The plurality of first electrodes 181 are respectively disposed in the plurality of pixel regions PX, two adjacent first electrodes 181 of the plurality of first electrodes 181 are separated by a second gap D2, and the width 7B-W of the one of the plurality of light shielding parts 7B is greater than or equal to the width D2-W of the second gap D2. In one embodiment of the present disclosure, the width D1-W of the first gap D1 may be, for example, less than or equal to the width D2-W of the second gap D2, and thus the proportion of the light L filtered by the color filter layer 3 can be increased, but the present disclosure is not limited thereto. In one embodiment of the present disclosure, as shown in FIG. 8, two adjacent reflective layers 2 of the plurality of reflective layers 2 are separated by a third gap D3, and the width D3-W of the third gap D3 may be, for example, less than or equal to the width D1-W of the first gap D1. In one embodiment of the present disclosure, one of the plurality of light shielding parts 7B and the third gap D3 are overlapped, and the width 7B-W of the one of the plurality of light shielding parts 7B is greater than or equal to the width D3-W of the third gap D3. Thus, the proportion of the light L reflected by the reflective layer 2 can be increased, but the present disclosure is not limited thereto. The "width of the gap" may refer to the above definition.

In the present disclosure, the material of the light shielding layer 7 can refer to the above and will not be described again here. In the present disclosure, other components and detailed structures of the electronic device of FIG. 8 to FIG. 9B can be as described above and will not be described again.

Figure 10:
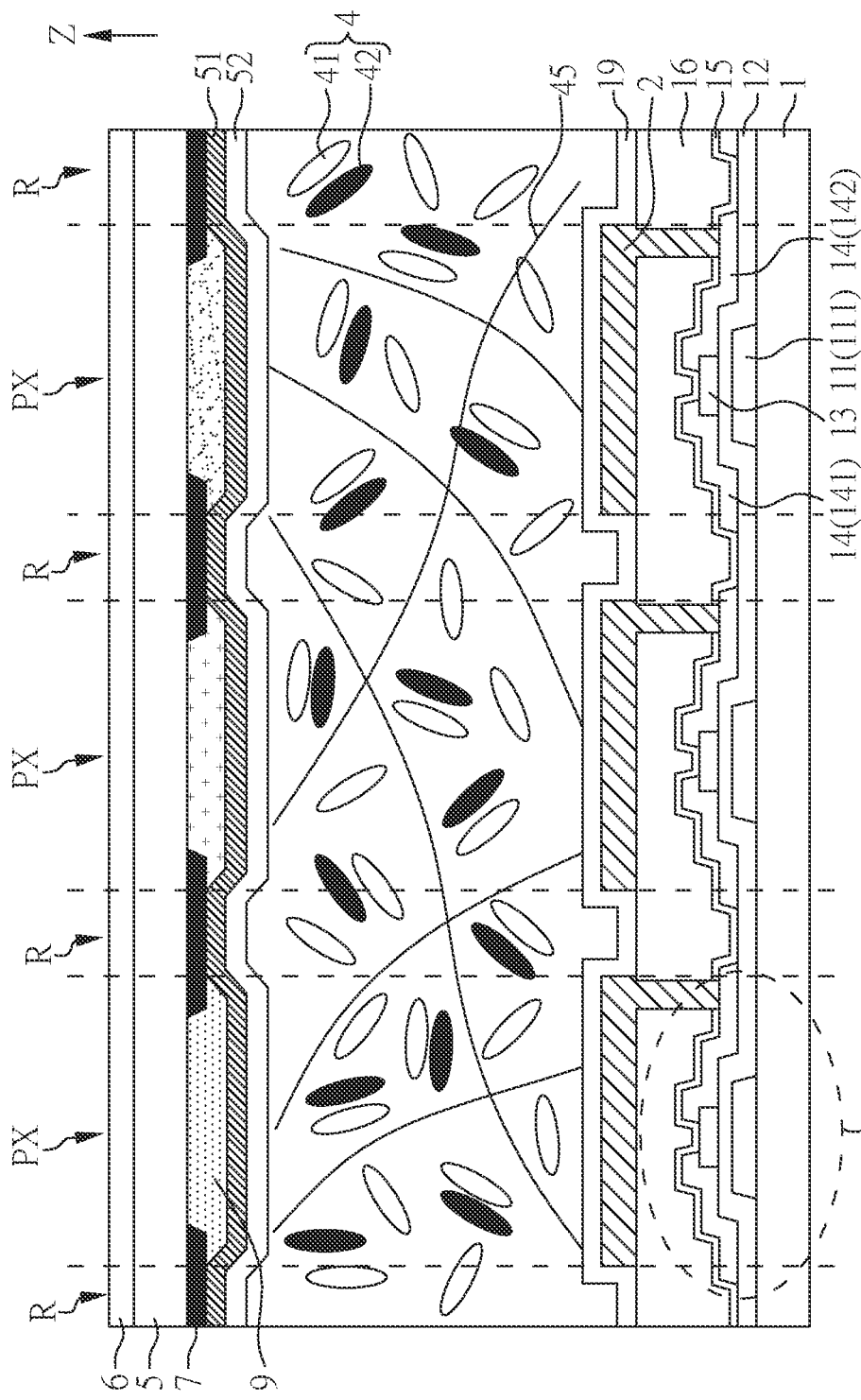
FIG. 10 is a schematic view of an electronic device according to one embodiment of the present disclosure.

FIG. 10 is a schematic view of an electronic device according to one embodiment of the present disclosure. The electronic device in FIG. 10 is similar to that shown in FIG. 8, except for the following differences.

In one embodiment of the present disclosure, the material of reflective layers 2 is a conductive material that has the function of reflecting light. The reflective layers 2 may have the functions of reflecting light and conducting electricity. Therefore, as shown in FIG. 10, the plurality of reflective layers 2 of the electronic device may be used as the plurality of first electrodes (shown in FIG. 8) to drive the display layer at the same time. In other words, the electronic device of FIG. 10 can omit the aforementioned first electrode layer 18 (the first electrodes 181), thereby achieving cost savings. It should be noted that, in the present embodiment, the "pixel region PX" refers to, for example, the area where the reflective layer 2 and the second electrode layer 51 are overlapped in the top view direction Z of the electronic device. In the present embodiment, the "pixel spacing region R" refers to the area between two adjacent pixel regions PX and, for example, it refers to the area where the first electrode 181 and the second electrode layer 51 are not overlapped in the top view direction Z of the electronic device.

In the present disclosure, other components and detailed structures of the electronic device in FIG. 10 can be as described above and will not be described again.

In the present disclosure, when the first alignment layer 19 and the second alignment layer 52 are, for example, horizontal alignment layers and the liquid crystal material 41 in the display layer 4 is, for example, positive liquid crystals, the long axis of the liquid crystal material 41, for example, rotates substantially along the direction of the electric field when a vertical electric field is generated between the first electrode 181 (or the reflective layer 2) and the second electrode layer 51; but the present disclosure is not limited thereto. When the first alignment layer 19 and the second alignment layer 52 are, for example, vertical alignment layers and the liquid crystal material 41 in the display layer 4 is, for example, negative liquid crystals, the long axis of the liquid crystal material 41, for example, rotates substantially perpendicular to the direction of the electric field when a vertical electric field is generated between the first electrode 181 (or the reflective layer 2) and the second electrode layer 51; but the present disclosure is not limited thereto. In the present disclosure, the electronic device may be a display device, such as a flexible display device, a touch display device, a curved display device or a tiled display device, but the present disclosure is not limited thereto. In the present disclosure, the electronic device may be a reflective display device. The display device may be applied to any device that needs a screen known in the art, such as monitors, mobile phones, laptops, camcorders, cameras, music players, mobile navigation devices, televisions and other electronic devices that need to display images; but the present disclosure is not limited thereto.

The specific embodiments above should be construed as illustrative only and not in any way limiting the remainder of the present disclosure.

Although the present disclosure has been explained in relation to its embodiment, it is to be understood that many other possible modifications and variations can be made without departing from the spirit and scope of the disclosure as hereinafter claimed.

The invention claimed is:

1. An electronic device, comprising a plurality of pixel regions and a plurality of pixel spacing regions, and comprising:
    a display layer disposed in the plurality of pixel regions and the plurality of pixel spacing regions, and comprising a liquid crystal material and a dye material;
    a plurality of reflective layers respectively disposed in the plurality of pixel regions, and disposed at one side of the display layer; and
    a plurality of color filter layers respectively disposed in the plurality of pixel regions, and disposed between the display layer and the plurality of reflective layers, wherein the plurality of color filter layers respectively comprise a filter material and a reflective material, a refractive index of the reflective material is greater than a refractive index of the filter material, and a difference between the refractive index of the reflective material and the refractive index of the filter material is greater than or equal to 0.3,
    wherein the display layer is in a scattering state under a non-display state, and at least part of light is scattered by the liquid crystal material and absorbed by the dye material when the light passes through the display layer,
    wherein the display layer in the plurality of pixel regions is in a transmissive state and the display layer in the plurality of pixel spacing regions is in a scattering state under a display state, and at least part of light passes through the liquid crystal material and the dye material in the plurality of pixel regions and is reflected by the plurality of reflective layers when the light passes through the display layer in the plurality of pixel regions.

2. The electronic device of claim 1, further comprising a light shielding layer having a plurality of opening parts and a plurality of light shielding parts, wherein the display layer is disposed between the light shielding layer and the plurality of color filter layers.

3. The electronic device of claim 2, wherein two adjacent color filter layers of the plurality of color filter layers are separated by a first gap, one of the plurality of light shielding parts and the first gap are overlapped, and a width of the one of the plurality of light shielding parts is greater than or equal to a width of the first gap.

4. The electronic device of claim 2, further comprising a plurality of first electrodes respectively disposed in the plurality of pixel regions, wherein two adjacent first electrodes of the plurality of first electrodes are separated by a second gap, one of the plurality of light shielding parts and the second gap are overlapped, and a width of the one of the plurality of light shielding parts is greater than or equal to a width of the second gap.

5. The electronic device of claim 2, wherein the plurality of opening parts are disposed in the plurality of pixel regions, and the plurality of light shielding parts are disposed in the plurality of pixel spacing regions.

6. The electronic device of claim 2, wherein two adjacent reflective layers of the plurality of reflective layers are separated by a third gap, one of the plurality of light shielding parts and the third gap are overlapped, and a width of the one of the plurality of light shielding parts is greater than or equal to a width of the third gap.

7. The electronic device of claim 1, further comprising a plurality of first electrodes respectively disposed in the plurality of pixel regions, wherein two adjacent color filter layers of the plurality of color filter layers are separated by a first gap, two adjacent first electrodes of the plurality of first electrodes are separated by a second gap, and a width of the first gap is less than or equal to a width of the second gap.

8. The electronic device of claim 1, wherein two adjacent color filter layers of the plurality of color filter layers are separated by a first gap, two adjacent reflective layers of the plurality of reflective layers are separated by a third gap, and a width of the third gap is less than or equal to a width of the first gap.

9. The electronic device of claim 1, wherein the plurality of reflective layers are used to drive the display layer.

10. The electronic device of claim 1, wherein the plurality of color filter layers respectively comprise a quantum dot material.

11. The electronic device of claim 1, wherein the liquid crystal material comprises polymer network liquid crystals, polymer dispersed liquid crystals, cholesteric liquid crystals, polymer stabilized cholesteric textures or a combination thereof.

12. The electronic device of claim 1, further comprising a light transmitting layer disposed between the plurality of color filter layers and the plurality of reflective layers.

13. An electronic device, comprising a plurality of pixel regions and a plurality of pixel spacing regions, and comprising:
    a display layer disposed in the plurality of pixel regions and the plurality of pixel spacing regions, and comprising a liquid crystal material and a dye material;

a plurality of reflective layers respectively disposed in the plurality of pixel regions, and disposed at one side of the display layer; and a plurality of color filter layers respectively disposed in the plurality of pixel regions, and disposed at one side of the display layer away from the plurality of reflective layers, wherein the plurality of color filter layers respectively comprise a filter material and a reflective material, a refractive index of the reflective material is greater than a refractive index of the filter material, and a difference between the refractive index of the reflective material and the refractive index of the filter material is greater than or equal to 0.3, wherein the display layer is in a scattering state under a non-display state, and at least part of light is scattered by the liquid crystal material and absorbed by the dye material when the light passes through the display layer, wherein the display layer in the plurality of pixel regions is in a transmissive state and the display layer in the plurality of pixel spacing regions is in a scattering state under a display state, and at least part of light passes through the liquid crystal material and the dye material in the plurality of pixel regions and is reflected by the plurality of reflective layers when the light passes through the display layer in the plurality of pixel regions.

14. The electronic device of claim 13, further comprising a light shielding layer having a plurality of opening parts and a plurality of light shielding parts, wherein the display layer is disposed between the light shielding layer and the plurality of color filter layers.

15. The electronic device of claim 14, wherein the plurality of opening parts are disposed in the plurality of pixel regions, and the plurality of light shielding parts are disposed in the plurality of pixel spacing regions.

16. The electronic device of claim 14, wherein two adjacent color filter layers of the plurality of color filter layers are separated by a first gap, one of the plurality of light shielding parts and the first gap are overlapped, and a width of the one of the plurality of light shielding parts is greater than or equal to a width of the first gap.

17. The electronic device of claim 14, further comprising a plurality of first electrodes respectively disposed in the plurality of pixel regions, wherein two adjacent first electrodes of the plurality of first electrodes are separated by a second gap, one of the plurality of light shielding parts and the second gap are overlapped, and a width of the one of the plurality of light shielding parts is greater than or equal to a width of the second gap.

18. The electronic device of claim 13, wherein two adjacent color filter layers of the plurality of color filter layers are separated by a first gap, two adjacent reflective layers of the plurality of reflective layers are separated by a third gap, and a width of the third gap is less than or equal to a width of the first gap.

* * * * *